Feb. 23, 1960     O. E. FIEROH     2,925,651
METHOD AND APPARATUS FOR ASSEMBLING BODY SEAT RINGS
Filed Jan. 26, 1956     2 Sheets-Sheet 1
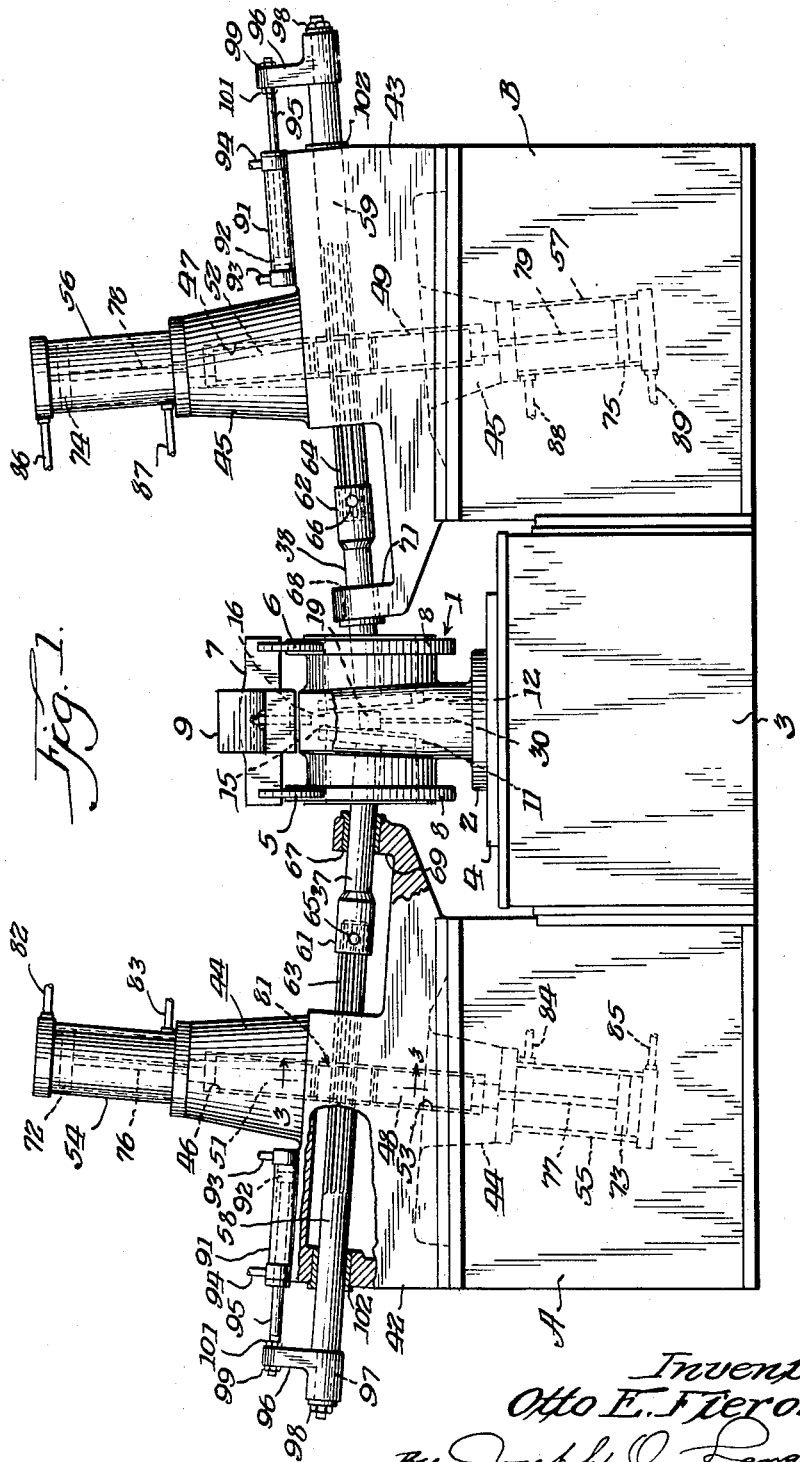
Inventor.
Otto E. Fieroh.
By Joseph O. Lange
Atty.

Feb. 23, 1960     O. E. FIEROH     2,925,651
METHOD AND APPARATUS FOR ASSEMBLING BODY SEAT RINGS
Filed Jan. 26, 1956     2 Sheets-Sheet 2
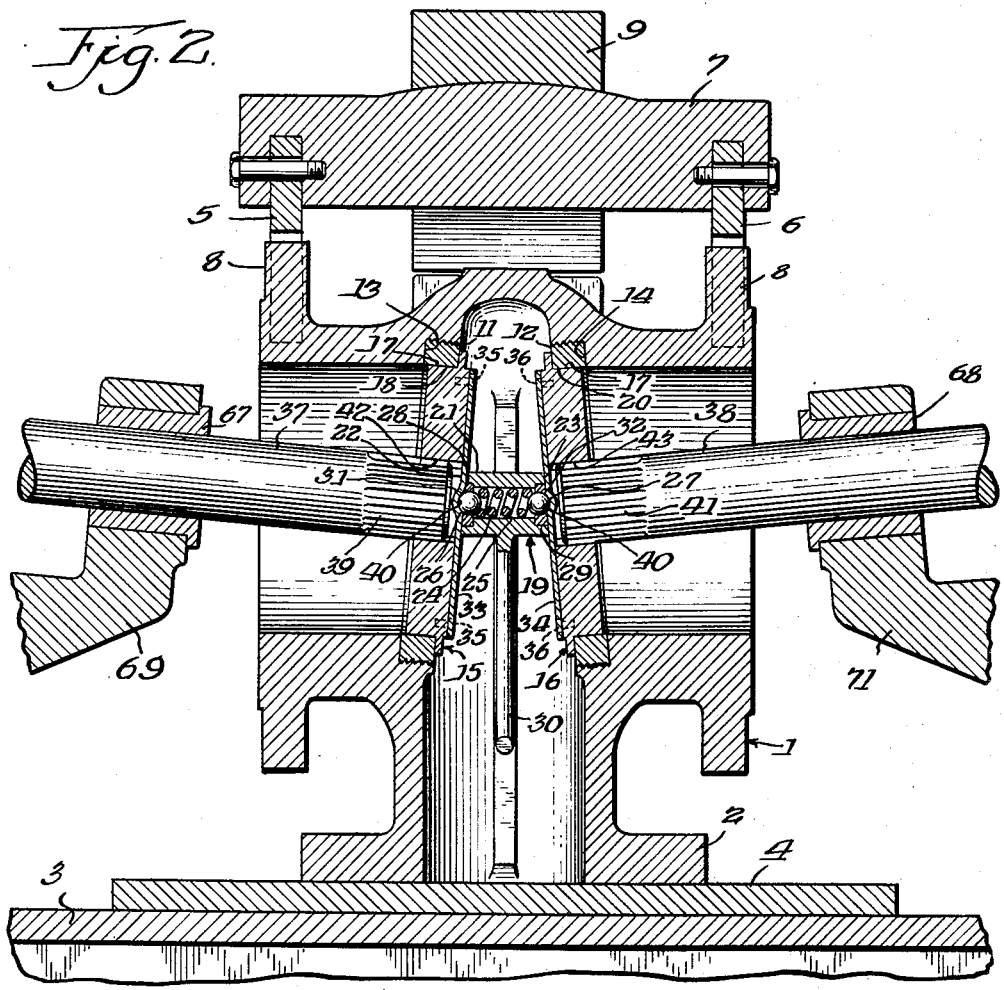
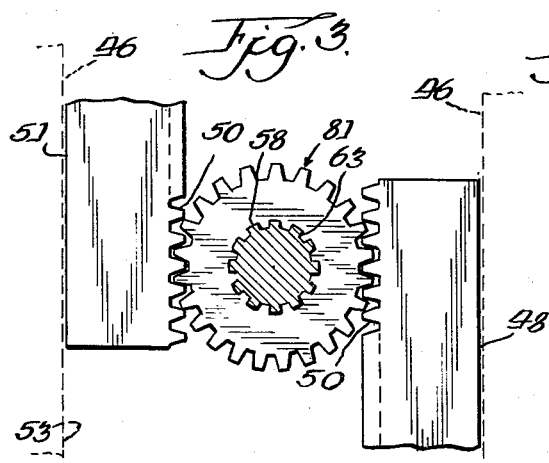
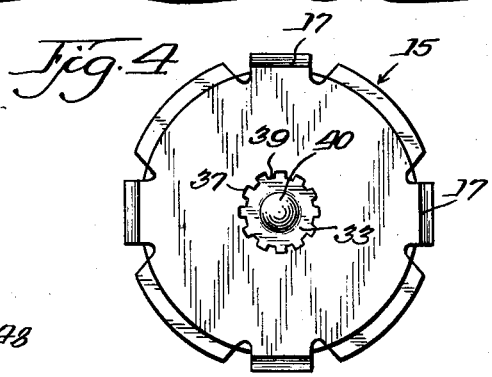
Inventor.
Otto E. Fieroh.
By Joseph O. Lange Atty.

United States Patent Office 2,925,651
Patented Feb. 23, 1960

2,925,651
METHOD AND APPARATUS FOR ASSEMBLING BODY SEAT RINGS

Otto E. Fieroh, Chicago, Ill., assignor to Crane Co., Chicago Ill., a corporation of Illinois Application January 26, 1956, Serial No. 561,459

5 Claims. (Cl. 29—240)

This invention relates to a method and apparatus for assembling body seat rings with a valve body, and which apparatus is also termed a two-way torque machine.

More particularly, the invention is concerned with the method and apparatus for assembling and positioning oppositely disposed threaded body seat rings simultaneously and preferably using fluid pressure cooperating with predeterminately arranged pistons and cylinders so that a certain amount of power or torque can be exerted with such driving force from the application of such power being suitably distributed or balanced.

In order to acquire a better understanding and appreciation of the background of this invention, it should be realized that in the valve manufacturing industry, for example, in assembling threaded body seat rings after suitable rotation into valve bodies or the like there has long existed the serious problem of determining and applying relatively uniformly the amount of force required in making such leak-proof assembly. There has further existed the need for performing such shop production operation relatively quickly, accurately and economically while still maintaining close control over the torque or driving force applied to the said seat rings during the course of rotating and completing of such assembly of the rings with the valve body.

It can well be realized that if the force which is applied to the valve rings in the course of seating them is of such degree as to be regarded as excessive, then objectionable stresses or strains can be imparted to the valve seat ring resulting either in distortion and poor seating or in some cases, actually results in the failure of the ring, including loosening to a degree and resulting in a defective valve or other serious trouble.

It is therefore one of the more important objects of this invention to provide a plural valve ring assembly apparatus overcoming such objections as hereinabove referred to and accurately applying the seat rings to the valve casing securely, quickly and cheaply even in the course of comparatively large production runs.

Another object is to provide for a machine of the character described in which there is the general application, say, of driving in two body rings into a gate valve body simultaneously, using fluid pressure and exerted within at least a pair of cylinders with cooperating pistons suitably positioned with relation to said valve body, and further in which a rack and pinion or other gear is so arranged that the pistons within the cylinders will operate in opposite directions while exerting an endwise force against the rack thereby to screw the body seat rings into place within the valve body with a predetermined force.

Another important object is to provide a method and apparatus in which such application of the driving force employed in seating the body rings is so distributed and arranged relative to each cylinder and piston so that greater power can be exerted while at the same time the driving force applied to the racks in seating the rings is uniformly distributed and balanced relative to each other.

Other objects and advantages will become more readily apparent upon proceeding with the specification read in light of the accompanying drawings, in which Fig. 1 is a sectional assembly view of apparatus embodying my invention.

Fig. 2 is fragmentary enlarged sectional view of the manner in which the invention is applied to the valve seat rings, either during assembly or removal.

Fig. 3 is an enlarged sectional view taken on the line 3—3 of Fig. 1.

Fig. 4 is a plan view of the wrench head employed.

Similar reference numerals refer to similar parts throughout the several views.

Referring now to Fig. 1, a gate valve body generally designated 1 is shown in inverted position, having the bonnet flange 2 mounted upon the machine stand 3 supported upon the flat surface 4 of the said machine stand. The stand 3 is flanked on each side portion by the supports A and B for carrying the driving mechanism as hereinafter described. The valve body 1 is held in fixed position as indicated at 5 and 6 by means of the swingable over-arm clamp 7 in cooperation with an applied power source (not shown) directed to the members 5 and 6 snugly engaging the end flanges 8 of the valve casing or body 1. It should be understood that preferably the clamp 7 has an upper overhanging portion 9 against which the holding force is directed downwardly to prevent the valve body from rotating or sliding upon the stand surface 4 and against which the valve bonnet flange 2 abuts as illustrated. Of course, other means of clamping or gripping the valve body and holding it against rotation or sliding during either the removal or installation of the valve seat rings may be used, depending upon the size or the shape of the valve casing.

As shown more clearly in Fig. 2, the valve body 1 upon which the instant invention is to be employed, is provided with the threaded seat rings 11 and 12 substantially oppositely disposed, which in this case are indicated in the seated position of the body and rings assembly. It will be noted that the said seat rings are shouldered at the respective annular surfaces 13 and 14 within the valve body when the seating operation which is hereinafter to be described has been completed. Preliminary to the said seating operation taking place, it should be understood that spaced-apart wrench heads generally designated 15 and 16 respectively and which are of the general notched configuration shown in plan in Fig. 4 are provided with the annularly arranged lugs 17 engaging similarly shaped channels or grooves designated 18 and 20 of substantially the same cross-sectional configuration on the inside periphery or ported portion of the body seat rings 11 and 12 respectively. It will of course be understood that the wrench heads 15 and 16 which are preferably power driven are positioned on the respective rings 11 and 12 and placed in the valve casing 1 before the latter member is clamped in the fixture to bear against the surface of the machine stand 4 as shown.

Similarly with respect to the timing of its positioning in the valve body, a spacer member generally designated 19 is interposed between the wrench heads as shown. It consists of a substantially cylindrical member 21 having tapered end surfaces as at 22 and 23, the angle of the latter tapered surfaces conforming generally with the angularity of the taper of the valve seat rings as they are finally positioned in the valve body as illustrated. The member 21 being hollow as at 24 receives the coil spring 25 and the resiliently mounted ball bearings at 26 and 27 respectively positioned at each end of said spring and being held in place thereon by means of the interposed rings 28 and 29, each of the said latter rings being soldered in fixed position relative to the head 21 and peened as at 31 and 32 so as to retain the ball bearings 26 and 27 resiliently against the coil spring 25.

It will be understood that the handle 30 which is preferably of looped form and integral with the spreader portion 21 is used to effect the installation and removal of the cylindrical spreader 19, as desired. It will further be clear that upon removing the machine stand 4, grasping the handle 30, and then drawing said handle transversely out of the body 1 through the body chamber and the bonnet opening defined by the flange 2, the spring-loaded wedge portion 19 can now be removed from between the wrench heads and the body seat rings. Upon withdrawal of the spacer member 19 with its looped handle 30, the wrench heads 15 and 16 can next be moved axially inward and out of engagement with the respective seat ring grooves 18 and 20 on the inner periphery or ported portions of said body seat rings 11 and 12. When, and if it becomes necessary to remove the said seat rings the latter members can be taken out laterally through the body chamber as described in connection with the member 19 and its handle 30.

It should further be understood that before the member 21 is interposed between the wrench heads the body seat rings 11 and 12 are threadedly assembled preferably by hand rotation and thus comparatively loosely received within their respective recesses in the valve body in almost seated position or just short of making the final end contact at surfaces 13 and 14 respectively. Such initial assembling of the rings 11 and 12 provides for the desired space between the wrench heads to permit fitting the spacer 19 therebetween. Then it follows that as hereinafter explained in greater detail the power application of a driving force is used to draw the seat rings to the final abutting contact against the end surfaces 13 and 14 of the casing under predetermined torque load.

The wrench heads 15 and 16 as shown are provided with the respective plate members 33 and 34 mounted in flat abutting relation thereon, each of which plates is recessed or dimpled as at 40 to receive in nested relation the ball bearings 26 and 27, and thus axially align the spreader 21 with relation to the wrench heads 15 and 16. The plates 33 and 34 are attached to the wrench heads by means of screws as shown in dotted lines at 35 and 36 respectively.

Referring to Fig. 2, for the purpose of effecting the desired rotation to the wrench heads the drive shafts 37 and 38 respectively are provided, mounted in non-rotatable relation to the said wrench heads. It will be understood that the said shafts are preferably splined on their exterior as at 39 and 41 and assembled so as to engage similar splined recesses 42 and 43 within the wrench heads. Thus far, the description of the driving assembly has been directed to the manner and structure in which the ball retained power driven wrench heads are mounted with relation to the body seat rings 11 and 12. It will of course be appreciated that the description is variable with respect to the manner in which the wrench heads grip the seat rings for purpose of effecting the rotation of the latter members in the course of either tightening them in position or subsequently loosening them as desired.

An important aspect of this invention lies in the novel manner in which the power may be applied and distributed in relation to shafts 37 and 38 in the course of rotating the respective wrench heads 15 and 16 simultaneously. This portion of the driving mechanism development is more clearly shown in Fig. 1. As a part of the arbor mountings 42 and 43, hollow cylinder and piston supports 44 and 45 are provided and as indicated in dotted lines are provided with the respective chambers 46 and 47 to receive and permit the desired endwise movement of the oppositely disposed gear racks 48 and 49 at opposite portions of the machine in a lower plane and 51 and 52 mounted at opposite end portions for movement in an upper plane. The racks are provided with the gear teeth 50 (see Fig. 3) and operate within a chamber 53. As shown more clearly in Fig. 3 they are respectively mounted within the chamber 46 and chamber 53 of the arbor mountings 42 and 43. It should be noted that each of the said supports 44 and 45 carries on its upper portion on each side of the horizontal axis of the machine a cylinder 54 and in a lower plane on the opposite side of the horizontal axis is a cylinder 55. In similarly described relation with respect to the arbor 43 the drive cylinders 56 and 57 are provided.

As shown more clearly at the left-hand portion of the figure, the arbor 42 (and 43 also) is hollow in order to receive and journal the respective rotating drive shafts 58 and 59. The latter are also axially movable as hereinafter explained and are connected as at couplings 61 and 62 to the drive shafts 37 and 38 respectively, the couplings being locked against relative rotation by engagement of the splines 63 on the drive shaft 58 and the splined portion 64 of the shaft 59. The coupling connection referred to is further held against accidental disassembly axially by means of the respective pins 65 and 66.

For the purpose of guiding the shafts 37 and 38 in their respective rotation, preferably a replaceable bearing member 67 and 68 is mounted on the transverse projections 69 and 71 of each arbor 42 and 43 respectively. It will be appreciated that the pitch or angle of the said projections with relation to the horizontal axis of the assembly is determined by the taper of the valve seats within the gate valve casing 1. This is perhaps more clearly shown in the enlargement in Fig. 2.

Now directing attention to Fig. 3, it will of course be appreciated that the respective cylinders 54 to 57 inclusive are provided with the usual reciprocally movable pistons designated in dotted lines 72 and 73 in the left side arrangement of cylinders 54 and 55 and pistons 74 and 75 in the upper and lower cylinders 56 and 57 respectively in the right-hand portion of the apparatus. It must be noted that driving connections are provided between the respective gear racks and the said pistons.

Thus, the rack 51 at its upper end portion is connected by means of the shaft 76 to the piston 72, while at the lower end portion of the oppositely disposed rack 48 the latter member is similarly attached as at 77 to the piston 73. It will also be noted that at the right-hand portion of the machine, with relation to the gear rack actuation, the pistons 74 and 75 are attached by means of their respective shafts 78 and 79 to the gear racks 52 and 49 shown in dotted lines. As viewed in the section taken on the line 3—3 of Fig. 1, and this section also applies to the right-hand side of the figure, a driving gear generally designated 81 is fitted between the respective gear racks 48 and 51 as shown, the gear being attached to the splined portion 63 of the shaft 58 as more clearly shown in Fig. 3.

It will of course be understood that the respective cylinders 72 et seq. referred to hereinabove are provided with the usual conduits for actuating communication with sources of fluid supply as at 82, 83, 84 and 85 in the left-hand side of the mechanism and at 86, 87, 88 and 89 in the right-hand end portion of the machine.

In operation of this mechanism, it should now be clear that as the fluid pressure is introduced simultaneously at inlets 82 and 85 and at inlets 86 and 89, the pistons affected are moved by such pressure within their respective cylinders to axially drive each of the gear racks 51 and 52 in one direction and the racks 48 and 49 in the other direction, thereby rotate the gears 81 from oppositely disposed sides of the gear to balance the force applied and avoiding objectionable distortion in the drive mechanism of the structure, causing the rotation of the shafts 58 and 59 in turn non-rotatably attached to the shafts 37 and 38 and the wrench heads 15 and 16.

It has been found that depending upon the initial amount of axial movement obtained in making the hand tightened initial attachment of the seat rings, the final tightening of the ring may actually occur within a very limited range of rotation between say 90° and not to exceed 180°.

It will of course be clear that by virtue of the simultaneous movement of the respective gear racks in opposite directions as above described, the force applied by the pistons as a driving means to effect the rotation of the seat rings can be relatively large without objectionably turning or distorting the casing or the seat rings as they are finally shouldered at the bottoming surfaces 13 and 14 within the said casing. It will be equally clear that the load applied by the respective pistons is balanced and uniformly well distributed throughout the machine structure thereby to avoid the concentration of stresses normally inherent in this type of drive mechanism. Thus it should be apparent that depending upon the size of the valve into which the seat rings are to be fitted the fluid pressure load in pounds per square inch in the cylinders, as hereinafter referred to, can be varied accordingly and uniformly applied to the body seat rings whether on the inlet or the outlet side of the valve, and, because of such desirable distribution of the load or driving force, stability in positioning of the valve casing is assured. It should be understood that while throughout this description reference has been made to seating or tightening the ring in position in the valve casing, conversely by merely reversing the application of the fluid pressure to the pistons the mechanism can be conveniently used to unseat the rings to permit of their removal for replacement or repair.

For purpose of withdrawal of the respective drive shafts 37 and 38 from their sliding splined connection with the wrench heads 15 and 16 and at the conclusion of the operation in seating the body rings, a hydraulic mechanism is employed. As shown more clearly in Fig. 1, this shaft withdrawal mechanism mounted at each end of the arbor mountings 42 and 43, consists of fluid cylinders 91 fitted with the pistons 92 and having the usual fluid conduit supply sources as indicated at 93 and 94 above and below the piston respectively for purpose of driving the latter member in either direction during the course of either seating the rings, that is, when threadedly mounting them within the valve casing, or else when in removing the seat rings it becomes necessary to make replacement. The piston 92 has its shaft portion 95 connected to the cross-arm member 96 which is rigidly attached to the shaft 58, as at 97, by means of the threaded nut 98. A similar fixed connection is effected with the piston shaft 95 by means of the lock nuts 99 and 101. It has been found desirable in avoiding objectionable wear or making convenient replacements to interpose a renewable bearing 102 in the arbor mountings.

In considering the operation of this phase of the machine, it will be apparent that merely upon supplying the fluid to the ends 93 of the cylinder 91, the shafts 58 and 59 may be suitably retracted to draw with them their respective shaft extensions 37 and 38, thus disengaging the shafts from the respective wrench head splined connections at 42 and 43 as at 39.

It should be apparent now that an important advantage of this invention lies in its reduction of or minimizing the importance of the human element in tightening or removing the valve seats 11 and 12. There is the additional benefit that the machine itself because of the unique form is not subjected to the strains normally present in seat ring driving mechanism of prior types.

It should also be apparent that while only a single embodiment has been illustrated and described in connection with this invention, the machine embodying its principles may be substantially changed to incorporate a wide variety of mechanisms without departing from the spirit of the invention as defined by the appended claims.

I claim:

1. A machine for assembling a plurality of oppositely disposed seat rings predeterminately rotatable for mounting within a valve body or the like with a horizontal axis and a vertical axis and having a bonnet opening on the vertical axis thereof and with a fluid passage extending through the said seat rings on the horizontal axis of the body, the machine comprising driving means for applying predetermined rotative movement to the seat rings simultaneously in seating or unseating the latter members within the valve body, the said driving means including fluid-actuated means positioned in different planes on opposite sides of and normal to the said vertical axis of the valve body, the said vertical axis of the body being an extension of the bonnet opening, shafts cooperating with the said fluid actuated means to impart rotative movement to the seat rings, cooperating racks and gears movable in opposite directions in response to said fluid actuated means and upon predetermined movement of the said fluid actuated means relative to said shafts, and means mounted in the valve body between the seat rings for holding the said seat rings in predetermined spaced-apart position relative to the valve body while imparting said rotative force substantially tangentially to the axis of rotation of said rings substantially on said horizontal axis of the body.

2. A machine for assembling a plurality of oppositely disposed seat rings within a valve body or the like with a horizontal axis and a vertical axis and having a bonnet opening on the vertical axis thereof and with a fluid passage extending through the said seat rings on the horizontal axis of the body, the machine comprising driving means for applying substantially tangentially a rotative movement to the said seat rings simultaneously in seating or unseating the latter members within the valve body, the said driving means including a pair of fluid-actuated cylinders and pistons positioned in different planes on opposite sides of and normal to the said vertical axis of the valve body, the said vertical axis of the body being an extension of the bonnet opening whereby a plane intersecting the bonnet opening axis and the fluid passage axis bisects the distance between said different planes, oppositely disposed shafts cooperating with the said cylinders and pistons to effect rotative movement of the seat rings, a plurality of oppositely disposed reciprocally movable racks and gears movable with said pistons in opposite directions upon predetermined movement of the pistons engaging said shafts, said movement of the gears on the racks being substantially on the vertical axis of the body, and means for holding the said seat rings in predetermined spaced-apart position relative to the valve body while imparting said rotative force tangentially to the said rings applied in a plane substantially on the said horizontal axis of the body.

3. Means for assembling a plurality of oppositely disposed rotatably mounted seat rings within a valve body or the like having a horizontal axis and a vertical axis and with a bonnet opening on the vertical axis thereof and with a fluid passage extending through the said seat rings on substantially the horizontal axis of the body, the combination of driving means including a pair of oppositely disposed shafts for applying a rotative movement of the seat rings simultaneously in seating or unseating the latter members within the valve body, resiliently biased means in the body for holding the said rings in spaced-apart relation while permitting rotation of the said rings, the said driving means including a pair of fluid-actuated cylinders with pistons positioned in different planes and moving in opposite directions on opposite sides of and normal to the vertical axis of the valve body, the vertical axis of the body being an extension of the bonnet opening whereby a plane intersecting the bonnet opening axis and the fluid passage axis bisects the distance between said different planes, means cooperating with the said cylinders and pistons to effect said rotative movement of the seat rings including substantially parallel racks and gears movable with said pistons in opposite directions in substantially vertical planes outside of the body upon predetermined movement of the pistons engaging said shafts, the vertical axis of the body substantially bisecting the said means for holding the seat rings in spaced-apart relation.

4. A two-way torque machine for assembling a plurality of oppositely disposed predeterminately rotatable seat rings within a valve body or the like simultaneously, the valve body having a horizontal axis and a vertical axis with a bonnet opening on the vertical axis thereof and with a fluid passage extending through the said seat rings on substantially the horizontal axis of the body, the machine having fluid driving means for applying a predetermined rotative movement and torque to the seat rings simultaneously in positioning the latter members in fixed axial relation to the valve body, the said vertical axis of the body being an extension of the bonnet opening in the body, the said fluid driving means including a plurality of fluid-actuated means positioned on opposite sides of and normal to the said vertical axis of the valve body, gripping means including wrench heads for the said rings, shaft means cooperating with the said fluid actuated means and the gripping means to effect said rotative movement of the seat rings, gear and rack means engageable with median portions of said shaft means and movable transversely relative thereto with said fluid actuated means in opposite directions upon predetermined movement of the fluid actuated means relative to the said shaft means to rotate the latter means simultaneously in the same direction on substantially the horizontal axis of the body, the said gear and rack means being removed relative to end portions of the body.

5. A machine for applying a plurality of torques in assembling oppositely disposed predeterminately rotatable seat rings within a valve body or the like, the said body having a horizontal axis and a vertical axis with a bonnet opening on the latter axis, the body having a fluid passage extending through the seat rings on substantially the horizontal axis thereof, the combination of fluid driving means for applying a rotative movement to the seat rings simultaneously in seating or unseating the latter members within the valve body, the said driving means including a plurality of fluid-actuated cylinders and pistons mounted in different planes on opposite sides of and normal to the vertical axis of the valve body, the vertical axis of the body being an extension of the bonnet opening whereby a plane intersecting the bonnet opening axis and the fluid passage axis bisects the distance between said different planes, shaft means cooperating with the said cylinders and pistons to effect said rotative movement of the seat rings, racks and gears movable with said pistons in opposite directions upon predetermined movement of the fluid actuated pistons engaging said shaft means in substantially vertical planes beyond the body, removable spacer means for maintaining the said seat rings in predetermined axial position relative to the valve body while imparting said rotative force to the said rings on substantially the horizontal axis of the body, the latter rings being rotatable while frictionally bearing against respective end portions of the said removable spacer means, and fluid actuated means for axially withdrawing the said shaft means.

References Cited in the file of this patent
UNITED STATES PATENTS

| | | |
|---|---|---|
| 389,144 | Gathmann | Sept. 4, 1888 |
| 1,182,356 | Davies | May 9, 1916 |
| 1,316,273 | Clark et al. | Sept. 16, 1919 |
| 1,765,825 | Cork | June 24, 1930 |
| 1,920,240 | Brady | Aug. 1, 1933 |
| 2,267,012 | Bowne | Dec. 23, 1941 |
| 2,398,392 | Page | Apr. 16, 1946 |
| 2,600,214 | Davis | June 10, 1952 |